Patented Aug. 17, 1954

2,686,797

UNITED STATES PATENT OFFICE 2,686,797

METHOD OF PRODUCING GLYCOLLIC ACID

Frederick C. Bersworth, Verona, N. J., and Arthur E. Martell, Shrewsbury, Mass.; said Martell assignor to said Bersworth No Drawing. Application May 18, 1949, Serial No. 94,053

4 Claims. (Cl. 260—429)

This invention relates to organic chemistry and has for its object the provision of a method for producing glycollic acid.

Another object is to provide a method of producing glycollic acid by condensing formaldehyde with an alkali metal cyanide in aqueous solution under controlled conditions of temperature and pH.

Other objects will be apparent as the invention is hereinafter disclosed.

Heretofore in the art the condensation reaction of formaldehyde with an alkali metal cyanide in aqueous solution has been disclosed (see Polstorff et al., Ber. Deut. Chem., vol. 45, pages 1905–1907 (1912); Kohn, Monats hefte für Chemie, vol. 20, page 903, 1896; and Romijin, Z. anal Chem., vol. 36, page 18, 1897). It is clear from the disclosures of these references that depending upon the temperature, pH, relative amounts of reactants, and other factors, a number of different end results or products may be obtained by this condensation reaction. The object of the present invention is to so control the condensation reaction as to produce, as an end-product, substantially pure glycollic acid in the form of its water soluble alkali metal salt and to recover this acid from the reaction solution in the form of its insoluble zinc salt.

We have discovered that when the condensation reaction is conducted in an aqueous solution having a temperature of 40° to 80° C. in the presence of alkali metal hydroxide sufficient to provide and maintain a solution pH of about 10.5, in such manner as to maintain at any one instant an extremely low concentration of free formaldehyde and an extremely high concentration of alkali metal cyanide in the solution so that at any one instant no free formaldehyde exists in the solution, the nitrile condensation product as it forms is hydrolyzed completely to glycollic acid which is immediately stabilized and retained in solution as the alkali metal salt of this acid by the free caustic alkali present from which solution the glycollic acid may be recovered by precipitation as the insoluble zinc salt by neutralizing the excess free alkali metal hydroxide and adding a soluble zinc salt, such as zinc chloride, to the solution.

As one specific embodiment of the invention, but not as a limitation thereof, we will disclose the same as it has been adapted for commercial production glycollic acid with the reactants formaldehyde, sodium cyanide and sodium hydroxide.

In this adaptation, a solution of sodium cyanide and sodium hydroxide in the ratio of one molar weight of the cyanide and 4 grams of the hydroxide per 200 cubic centimeters of water is placed in a container sealed from the atmosphere but provided with a pressure release valve venting the gases from the interior to the atmosphere at a low positive pressure (approximating 2 to 4 pounds) which is sufficient to exclude atmospheric gases from the container interior. Means vigorously agitating the solution is provided, together with means to feed an aqueous solution of formaldehyde into the solution but below the surface of the agitated solution, as well as means to heat the solution to a desired temperature within the range 40° to 80° C.

The alkaline pH sodium cyanide solution is then heated to a temperature approximating 70° C. and a 37% formaldehyde solution is slowly added to the heated agitated solution at a rate relative to the rate of $NH_3$ (gas) evolution from the solution that provides for the substantially complete and instantaneous conversion of the formaldehyde to nitrile at any one instant.

Normally, this rate of addition under the conditions defined will approximate that which adds one molar weight of the formaldehyde to the solution in a time period of about 4 hours. However, where the amount of sodium cyanide in the solution is greatly in excess of one molar weight per small increment of the 37% formaldehyde solution, as will be the case in large scale manufacturing operations, the size of the increment of formaldehyde added per time period may be increased materially.

The total amount of formaldehyde added to the solution approximates one molar weight per molar weight of sodium cyanide present in the solution. It is preferable to employ a slight excess of formaldehyde over that theoretically required to condense with all of the cyanide in order to insure the substantially complete condensation of the sodium cyanide and the elimination from the reaction solution of substantially all cyanide ions.

Following the addition of all of the formaldehyde to the solution, the solution is heated to a temperature of from 90° to the boiling point of the solution with continued stirring to complete the nitrile hydrolysis reaction and to eliminate substantially all of the gaseous ammonia from the solution. During the latter stage of this heating it is advantageous to pass a pressure of an inert gas, such as nitrogen, through the solution to facilitate the expulsion of the residual ammonia from the solution and from the interior of the container through the pressure release valve.

The resulting reaction solution consists essentially of the sodium salt of glycollic acid in aqueous alkaline pH solution. To recover the glycollic acid from this solution the free caustic alkali is neutralized with a strong mineral acid to a solution pH of about 7.5 to 8 and the insoluble zinc salt of glycollic acid is precipitated with zinc chloride solution. The zinc salt is filtered off, washed with cold water and dried. The glycollic acid content of this salt may be recovered from this salt by known chemical methods.

The chemical reactions involved in the above process differs materially from those obtained under the prior art conditions in that the ammonia ($NH_3$) liberated upon hydrolysis of the condensation reaction product is immobilized against substitution reaction with the hydrolysis product or with formaldehyde by the free caustic alkali present which also stabilizes the glycollic acid hydrolysate by neutralization of the carboxylic group. As the amount of free formaldehyde present in the reaction solution is maintained extremely low and approximating that amount which is substantially immediately reacted with the sodium cyanide present, the formation of side reaction products between the formaldehyde and the glycollic acid salt is suppressed and held to a low order.

Under carefully controlled time, temperature and pH conditions, substantially as outlined above, yields of the glycollic acid salt running as high as 95% of the theoretical have been obtained by this process.

In substitution for the sodium cyanide and sodium hydroxide in the above specific embodiment we may employ any other alkali metal cyanide or hydroxide. It is preferable, however, to employ the cyanide and hydroxide of the same alkali metal.

Various modifications and departures from the invention as described above will occur to those skilled in the art but all such modifications and departures therefrom are contemplated as may fall within the scope of the following claims.

What we claim is:

1. The method of producing glycollic acid which comprises condensing formaldehyde with an alkali metal cyanide in an aqueous solution maintained at a temperature within the range of 40° to 80° C. in the presence of free alkali metal hydroxide sufficient to maintain the pH of the solution at about 10.5, the formaldehyde being added to the solution at a rate such that at any one instant that amount of formaldehyde is present which is subsantially immediately condensed to nitrile for hydrolysis to glycollic acid and neutralization of said acid by free alkali metal hydroxide to an alkali metal salt.

2. The method in accordance with claim 1, wherein the glycollic acid salt reaction product is recovered from the reaction solution as the insoluble zinc salt by stripping the residual ammonia from the solution, neutralizing the free alkali metal hydroxide present therein, adding a soluble zinc salt to the solution, and recovering the precipitated zinc glycollate.

3. The method in accordance with claim 1, wherein the said formaldehyde in aqueous solution is added to a vigorously agitated alkali metal cyanide solution in a total amount slightly in excess of that amount providing equal molar weights of formaldehyde and cyanide in the solution and wherein the amount of free alkali metal hydroxide present in the solution is that which maintains a pH of at least 10.5 in the solution throughout the formaldehyde addition.

4. The method of producing the sodium salt of glycollic acid which comprises condensing formaldehyde with sodium cyanide in the presence of free sodium hydroxide sufficient to provide and maintain a solution pH of 10.5 in a aqueous solution maintained at about 70° C., the rate of formaldehyde addition being such that at any one instant there is present an amount of formaldehyde which is substantially immediately and completely condensed to nitrile and then hydrolized to glycollic acid which glycollic acid is neutralized by the free sodium hydroxide in the solution.

References Cited in the file of this patent

UNITED STATES PATENTS

| Number | Name | Date |
| --- | --- | --- |
| 1,802,154 | Michael et al. | Apr. 21, 1931 |
| 2,152,852 | Loder | Apr. 4, 1939 |

FOREIGN PATENTS

| Number | Country | Date |
| --- | --- | --- |
| 573,648 | Great Britain | Nov. 29, 1945 |
| 573,702 | Great Britain | Dec. 3, 1945 |

OTHER REFERENCES

Polstorff et al.: Ber. Deut. Chem., vol. 45, pages 1905–12 (1912).